United States Patent
Antal et al.

(10) Patent No.: US 8,366,027 B2
(45) Date of Patent: *Feb. 5, 2013

(54) ADJUSTABLE METERED MATERIAL DISPENSER

(75) Inventors: Keith E. Antal, Valatie, NY (US); James E. Johanson, Old Chatham, NY (US); Scott Peterson, Cary, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 176 days.

This patent is subject to a terminal disclaimer.

(21) Appl. No.: 12/733,633

(22) PCT Filed: Sep. 10, 2008

(86) PCT No.: PCT/US2008/075835
§ 371 (c)(1),
(2), (4) Date: Oct. 25, 2010

(87) PCT Pub. No.: WO2009/036049
PCT Pub. Date: Mar. 19, 2009

(65) Prior Publication Data
US 2011/0036934 A1    Feb. 17, 2011

Related U.S. Application Data

(60) Provisional application No. 60/993,863, filed on Sep. 14, 2007.

(51) Int. Cl.
*E01C 19/20*    (2006.01)
*G01F 11/26*    (2006.01)
*G01F 11/28*    (2006.01)

(52) U.S. Cl. ........ 239/689; 239/650; 239/652; 222/441; 222/454; 222/456

(58) Field of Classification Search ................ 239/650, 239/652, 689; 222/189.02, 189.03, 441, 222/454–456, 457.5
See application file for complete search history.

(56) References Cited

U.S. PATENT DOCUMENTS

| 576,241 A | 2/1897 | Van Arne |
| 845,347 A | 2/1907 | Gesell |
| 897,453 A | 9/1908 | Byam |

(Continued)

FOREIGN PATENT DOCUMENTS

| DE | 19917652 C2 | 12/2000 |
| EP | 0335505 A1 | 10/1989 |

(Continued)

OTHER PUBLICATIONS

The International Bureau of WIPO, International Preliminary Report on Patentability, International Application No. PCT/US2008/075835, Mar. 16, 2010.

*Primary Examiner* — Darren W Gorman
(74) *Attorney, Agent, or Firm* — Ryndak & Suri LLP

(57) ABSTRACT

A dispenser is provided for delivering a controlled quantity of a granular material. The dispenser includes a reservoir that retains granular material. The reservoir is supported in the dispenser with a passageway defined between opposing ends. A nozzle is provided for the outflow of material from the reservoir to a metering cup. A control plug is provided within the metering cup to adjust the controlled volume to be received within the cup from the reservoir. Once the metering cup is filled, the dispenser is inverted and the volume of material is directed from the cup, through the passageway and out of an opening adjacent a diffuser. The control plug is removable from the cup to vary the charge of material to be dispensed.

23 Claims, 9 Drawing Sheets

U.S. PATENT DOCUMENTS

| | | | |
|---|---|---|---|
| 903,548 A | | 11/1908 | De Hayes |
| 913,027 A | | 2/1909 | Meaker |
| 934,493 A | | 9/1909 | Wolkenstein |
| 1,084,530 A | | 1/1914 | Bettman |
| 1,123,974 A | * | 1/1915 | Antoine et al. ............... 222/455 |
| 1,270,262 A | | 6/1918 | Buckland |
| 1,618,688 A | | 2/1927 | Tempest |
| 1,707,967 A | | 4/1929 | Abbott |
| 1,727,799 A | | 9/1929 | Abbott |
| 1,763,449 A | | 6/1930 | Trautvetter |
| 1,877,808 A | | 9/1932 | Cagliostro |
| 1,891,787 A | | 12/1932 | Swartz |
| 1,938,100 A | * | 12/1933 | Gessler .................. 222/455 |
| 1,941,745 A | | 1/1934 | Higley |
| 1,982,094 A | | 11/1934 | Gessler |
| 2,021,004 A | * | 11/1935 | Garrido .................. 222/455 |
| 2,022,031 A | | 11/1935 | Fisher |
| 2,136,805 A | | 11/1938 | Scharinger |
| 2,423,784 A | | 7/1947 | Mackey |
| 2,604,235 A | | 7/1952 | Teston |
| 2,644,616 A | | 7/1953 | Gordon |
| 2,693,301 A | | 11/1954 | Allen, Jr. |
| 2,704,623 A | | 3/1955 | Yasso |
| 2,752,076 A | * | 6/1956 | Locker .................. 222/455 |
| 2,980,297 A | | 4/1961 | Tucci |
| 3,172,580 A | | 3/1965 | Mackey |
| 3,229,856 A | | 1/1966 | Jungmann |
| 3,258,177 A | | 6/1966 | Ellis |
| 3,323,683 A | | 6/1967 | Cianciolo |
| 3,344,962 A | | 10/1967 | Popivalo |
| 3,353,725 A | | 11/1967 | Caceres |
| 3,398,857 A | | 8/1968 | Alio |
| 4,201,320 A | | 5/1980 | Eppenbach |
| 4,424,921 A | | 1/1984 | Feuerstein et al. |
| 4,728,011 A | | 3/1988 | Schuster et al. |
| 4,757,916 A | | 7/1988 | Goncalves |
| 4,779,771 A | | 10/1988 | Song |
| 4,790,453 A | | 12/1988 | Fontana et al. |
| 4,828,149 A | | 5/1989 | Hester |
| 4,951,839 A | | 8/1990 | Kong |
| 4,961,521 A | | 10/1990 | Eckman |
| 5,024,616 A | | 6/1991 | Ogle, II |
| 5,169,049 A | | 12/1992 | Krupic et al. |
| 5,346,105 A | | 9/1994 | Onneweer |
| 5,454,487 A | | 10/1995 | Vassiliou |
| 5,467,903 A | | 11/1995 | Sorensen et al. |
| 5,601,213 A | | 2/1997 | Daniello |
| 5,683,361 A | | 11/1997 | Elk et al. |
| 5,711,463 A | | 1/1998 | Chen et al. |
| 5,839,619 A | | 11/1998 | Willer |
| 5,894,965 A | | 4/1999 | Robbins, III et al. |
| 6,269,983 B1 | | 8/2001 | Jones et al. |
| 6,382,461 B1 | | 5/2002 | Olsson |
| 6,422,426 B1 | | 7/2002 | Robbins, III et al. |
| 6,494,350 B2 | | 12/2002 | Kelley |
| 6,516,973 B2 | | 2/2003 | Chrisman et al. |
| 6,948,641 B1 | | 9/2005 | Williams |
| 7,143,909 B2 | | 12/2006 | Peterson et al. |
| 2001/0007327 A1 | | 7/2001 | Ritsche et al. |
| 2002/0066747 A1 | | 6/2002 | Argentieri et al. |
| 2005/0258189 A1 | | 11/2005 | Peterson et al. |

FOREIGN PATENT DOCUMENTS

| | | |
|---|---|---|
| GB | 2119285 A | 11/1983 |
| WO | WO 98/08065 | 2/1998 |
| WO | WO 02/26416 A1 | 4/2002 |

* cited by examiner

ADJUSTABLE METERED MATERIAL DISPENSER

RELATED APPLICATION

The present application, claims priority from U.S. provisional application No. 60/993,863, filed Sep. 14, 2007; said application being herein incorporated by reference.

FIELD OF THE INVENTION

The device relates to dispensers for delivering a predetermined amount of granular/particulate material.

BACKGROUND

Dispensers are commonly employed to deliver granular/particulate material, such as seasoning, colorants, concentrates, powdered mixtures, etc. For example, dispensers are used to add seasonings and flavorings to foods and/or beverages. Typically, seasonings such as table salt and ground pepper are dispensed from shakers comprising a single-chamber container or reservoir. The container may include an end cap comprising a plurality of apertures to allow the material to be dispensed upon inverting and agitating the shaker. The size and number of apertures will vary with the type of material to be dispensed. For example, a dispenser for table salt will typically have fewer apertures than, for example, a pepper dispenser inasmuch as the density and concentration of table salt is such that smaller quantities are desired (i.e., with each oscillation of the container.) Generally, a dedicated dispenser with the appropriately sized/numbered apertures will be employed for each material to control the dispensing rate. While the size and number of apertures can control the flow rate of material, the user must monitor other variables such as the length of time, number of oscillations, etc., to accurately control the quantity of dispensed material.

Many prior art dispensers address the need to deliver a controlled or preset amount of material by employing two or more chambers and a delivery tube. A first chamber forms a material reservoir while a second chamber is calibrated for measuring the material. The chambers are typically stacked, one above the other or in tandem. The delivery tube communicates with the measuring chamber at one end, extends through the reservoir, and at the opposite end communicates with the apertures of the dispenser. See, e.g., Abbott U.S. Pat. No. 1,707,967; Trautvetter U.S. Pat. No. 1,763,449; and Gordon U.S. Pat. No. 2,644,616.

Yet another metered material dispenser is disclosed in Jones et al. U.S. Pat. No. 6,269,983. Therein, a measuring cup is disposed in one end of the dispenser for receiving material when the dispenser is face-up, i.e., with the dispensing end facing upwardly. When the dispenser is inverted, material flows into a passageway defined by and between co-axial, cylindrical containers. Once in the passageway, the material flows downwardly and out of a dispensing end or diffuser. The configuration and spacing of the containers restricts dispensing of excess material, even when agitated. This Jones patent is commonly assigned with the present application and is herein incorporated by reference.

Eckman U.S. Pat. No. 4,961,521 discloses an adjustable metered dispenser useful for delivering seasonings such as salt and pepper. Eckman's dispenser comprises two chambers arranged in seriatim. The first chamber is a material reservoir and the second chamber is a measuring chamber. Eckman's dispenser exhibits an ability to close the metering chamber from the reservoir chamber when the material is dispensed. Thus, in order to avoid over-dispensing, the user must be sure that the passageway between the two chambers is closed.

Krupic U.S. Pat. No. 5,169,049 discloses a dispenser for seasonings, such as salt and pepper. The shaker comprises three chambers: a material reservoir chamber, a measuring chamber and a dispensing chamber. The reservoir chamber is disposed between the measuring chamber and the dispensing chamber while a delivery tube communicates with the measuring chamber and the dispensing chamber. When the dispenser is not in use, the measuring chamber faces downwardly. During use, the dispenser is inverted, and the dispensing chamber is filled with the material from the measuring chamber. The material must then be dispensed by shaking the dispenser in the inverted position to evacuate the material from the dispensing chamber via a plurality of apertures. In order to prevent over dispensing, one embodiment of the device includes shake-back guards within the reservoir chamber.

Peterson et al. U.S. Pat. No. 7,143,909 shows a dispenser capable of dispensing a variable quantity of a material or for dispensing a variety of different materials. This Peterson application is commonly assigned with the present application and is herein incorporated by reference.

BRIEF SUMMARY

A dispenser is provided for delivering a controlled quantity of a granular material. The dispenser comprises a container assembly, a diffuser and a metering cup. A control plug is provided for setting or adjusting the measured quantity of material prior to dispensing. The container assembly includes a reservoir disposed within a container and a passageway is defined around the reservoir. The reservoir is adapted for containing the granular material and defines a nozzle for the outflow of material. The metering cup is disposed within the container assembly and has an open end adapted to receive a fixed quantity of material from the nozzle. The control plug is positioned within the metering cup and adjacent the nozzle. Granular material is collected within the confines of the plug, when the dispenser is disposed in a first orientation. The plug at least partially fills the volume of the metering cup; thus reducing the material "charge" (as compared to the full volume within the metering cup). The plug may take the form of a relatively smaller cup, may be an extended circular ring or may be any structure that fills at least a portion of the metering cup. The material is dispensed by inverting the container assembly, i.e., in a second orientation, such that material flows out of the metering cup, into the passageway and out onto the diffuser.

BRIEF DESCRIPTION OF THE DRAWINGS

For the purpose of illustrating the invention, the drawings show forms of the invention that are presently preferred. However, it should be understood that this invention is not limited to the precise arrangements and instrumentalities shown in the drawings.

DETAILED DESCRIPTION OF THE DRAWINGS

Figure 1:
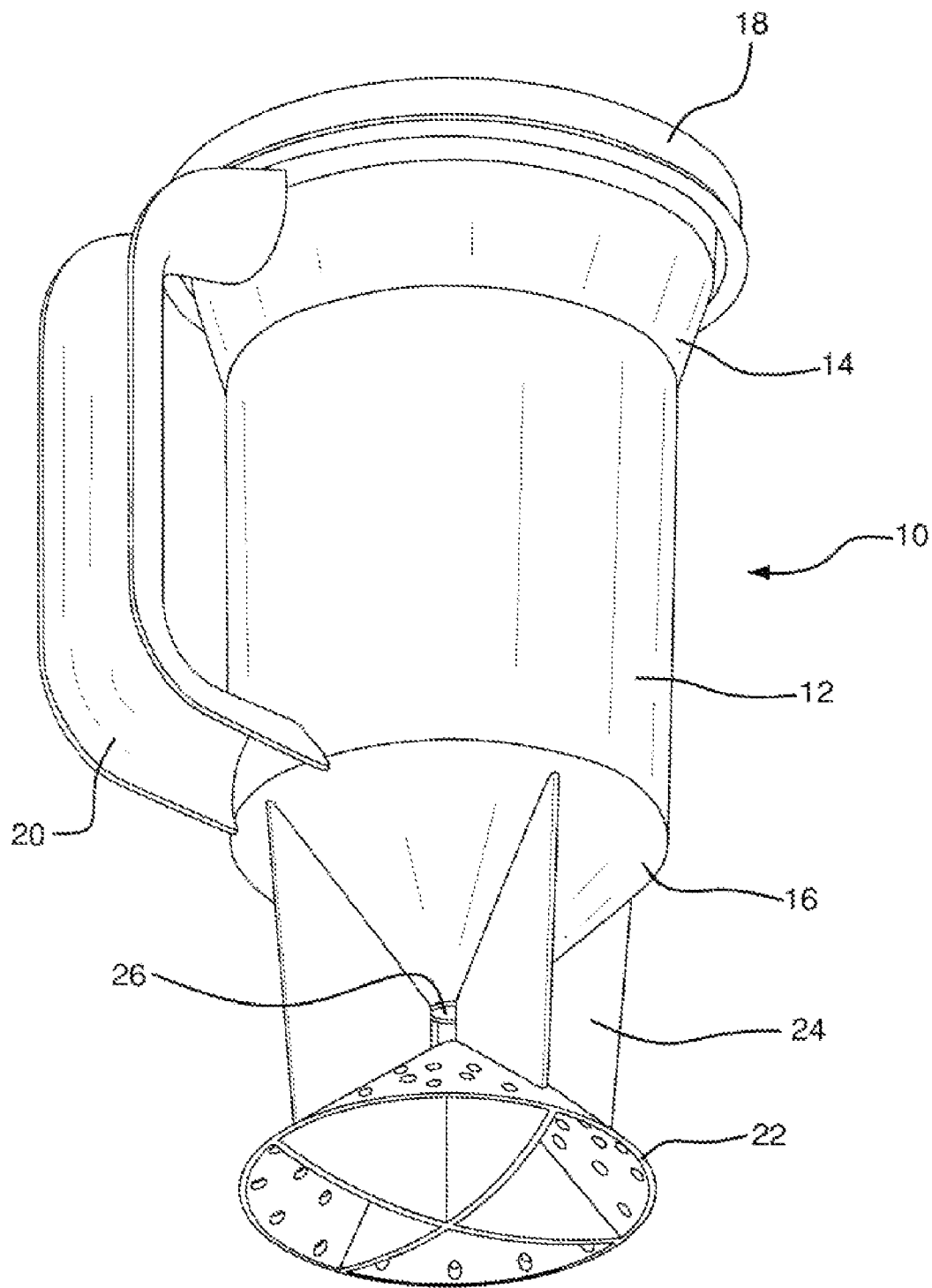
FIG. 1 is a perspective view of an embodiment of a dispenser shown in a dispensing position.

Referring now to the drawings wherein like numerals indicate like elements, FIG. 1 depicts an exemplary embodiment of a dispenser 10 according to the present invention. The dispenser 10 is primarily used to dispense medium to coarse particulate material, such as salt, but may also be used to dispense fine or ultra-fine granular material, such as confection sugar, cinnamon or other such seasonings. Furthermore, while the teachings herein are described in the context of the food service/preparation industry, it will be appreciated that the teachings herein are applicable to measuring and dispensing any granular or particulate material. Examples include the measurement and delivery of particulate materials in the building industry, e.g., cements, stone dust, sand, or in the manufacturing industry, e.g., concentrate in plastics, colorants in wax, etc. As will become readily apparent from the following detailed description, the dispenser 10 is multi-purpose and may be reconfigured to dispense variable quantities of material or dispensing a variety of different materials.

The dispenser 10 comprises a central, generally cylindrical container or enclosure 12, which is to be loaded or filled with a granular material (not shown in FIG. 1). At one end of the container 12 is a flared end portion 14. At the opposite end of the container 12 is a cone shaped collector 16. A cap 18 is provided on the flared end 14 and a diffuser 22 is disposed at the collector end 16 via ribs 24. The ribs 24 support the diffuser 22 on the outside surface of the collector 16. A collector opening 26 is formed in the collector 16. As explained in more detail below, granular material falls from opening 26 and is diffused by diffuser 22 over a food product. A handle 20 is connected to the container 12 for holding and manipulating the dispenser 10 between the upward position and the inverted, dispensing position. The dispenser 10 is preferably comprised of a rigid material such as plastic, metal or glass. However, it may be comprised of flexible materials.

Figure 2:
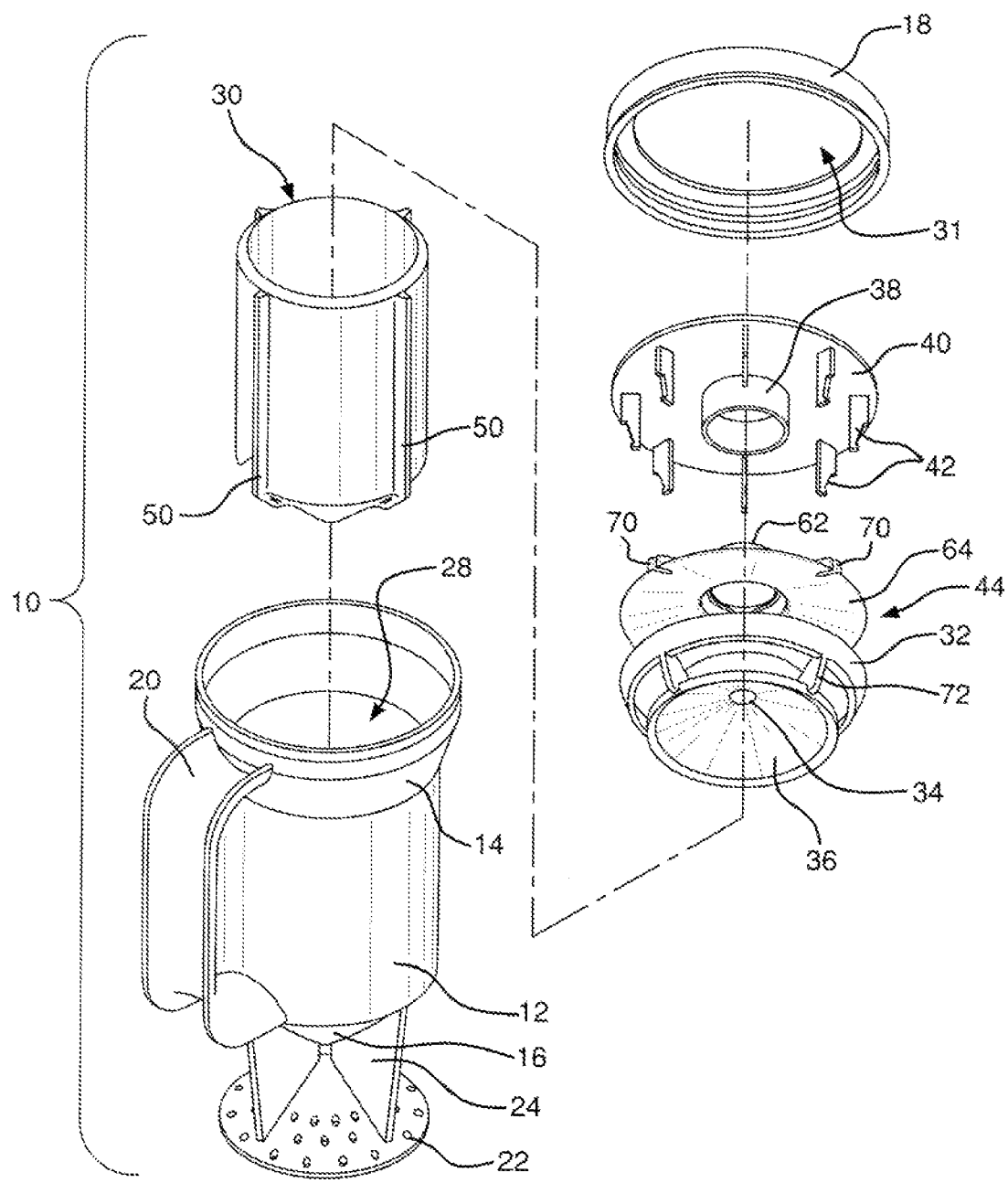
FIG. 2 is an exploded perspective view of the dispenser shown in FIG. 1.
Figure 3:
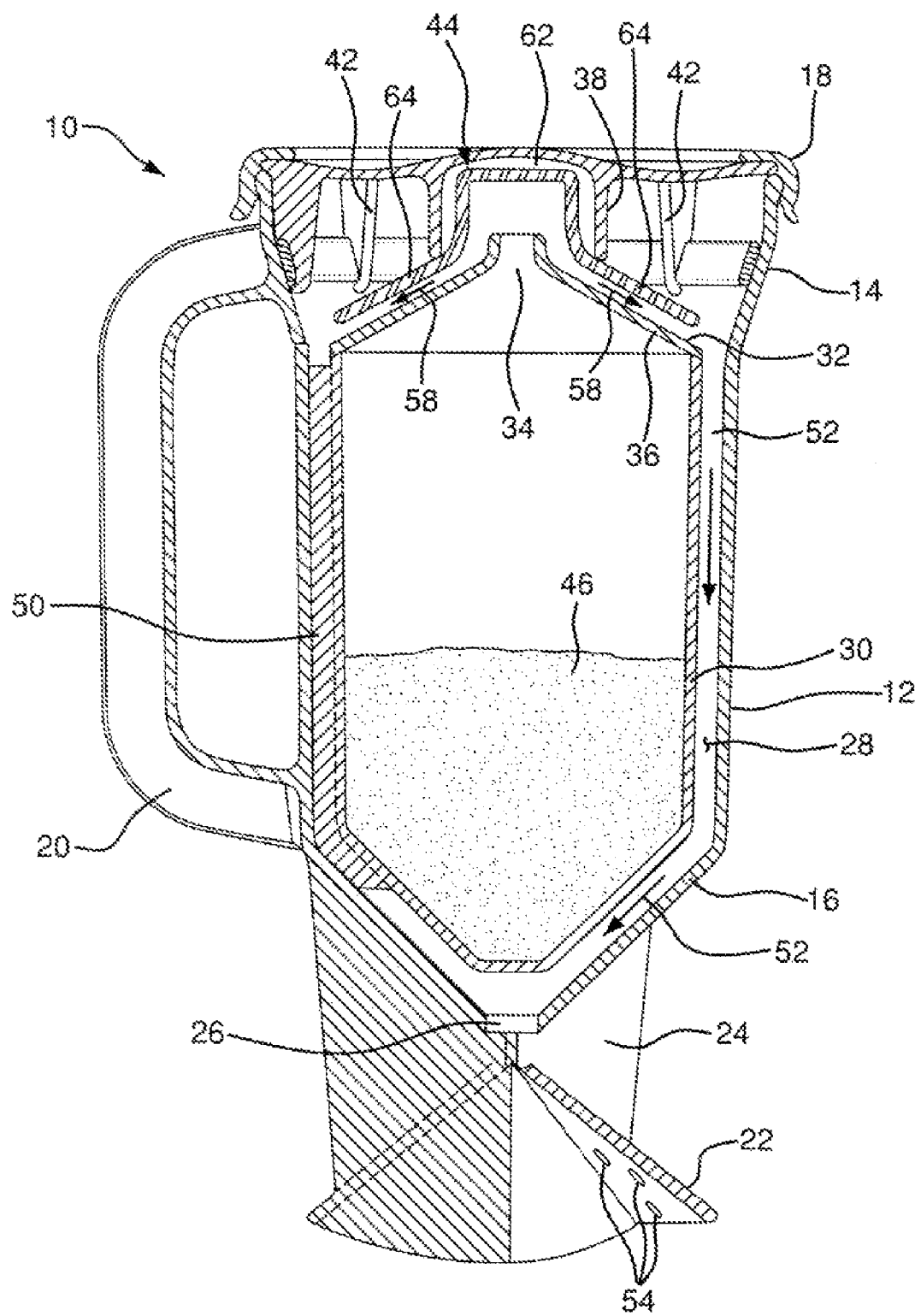
FIG. 3 is a cross sectional view of the dispenser shown in FIGS. 1 and 2.

FIG. 2 is an exploded perspective view of the embodiment of the invention shown in FIG. 1. The container 12 defines an internal volume 28, which is accessible by removal of the cap 18 from the flared end 14 of the dispenser 10. An inner reservoir 30 is positioned within the internal volume 28. A plurality of fins 50 attached to or formed as part of the reservoir, position the reservoir 30 within the internal volume 28 of the container 12. The reservoir 30 may be removable from the container 12 when empty and replaced with a reservoir filled with a charge of material. As shown in FIG. 3, the reservoir 30 defines an internal volume that retains the material to be dispensed by the dispenser 10. The internal reservoir 30 includes a reservoir cap 32, which encloses one end of the reservoir 30. A nozzle 34 is defined at the base of an angled surface 36 of the cap 32. A metering cup 38 is provided on a wall portion 40 of the cap 18. The cap 18 is generally circular and has an area 31 into which the wall portion 40 snugly fits. The cap 18 and wall 40 may also be made as an integral unit.

Positioned between the wall portion 40 of the cap 18 and the reservoir cap 32 is a control plug 44, which is discussed in greater detail below. Slots 70 formed in a baffle plate 64 engage tabs 42, projecting from the wall portion 40. The slots 70 also engage reservoir ribs 72, which fixes the position of the baffle plate 64. As illustrated, the control plug 44 is removable. An open area 58 (FIG. 3) is defined between the baffle plate 64 and the angled surface on the outside of the reservoir cap 32.

Referring now to the cross section of FIG. 3, there is shown the enclosure of the container 12 having the internal reservoir 30 positioned therein. The outside dimension of the reservoir 30 is shown to be less than the internal dimension 28 of the container assembly 12 and defines a passageway 52 therebetween for directing granular material 46 from the metering cup 38 to the collector opening 26 for deposition onto the diffuser 22. As shown in cross section in FIG. 3, the fins 50 position the reservoir 30 within the internal volume 28 of the container 12. The angled surface 36 is spaced from the baffle plate 64 and defines the open area 58 which feeds the passageway 52.

As illustrated in FIG. 3, the dispenser 10 is in an inverted dispensing position (i.e., a "second orientation"). The dispenser 10 normally sits on its cap 18 with the diffuser 22 projecting upwardly. In this first position or orientation, the granular material 46 within the reservoir 30, by the force of gravity, moves downwardly to the angled surface 36 and a portion thereof passes through the nozzle 34 toward the metering cup 38 and into the control plug 44. As will be discussed in further detail below, upon inverting the dispenser 10 to the position shown in FIG. 3, the volume of material in the control plug 44 moves outside the angled surface 36 into the passageway 52, and across the collector 16 to the opening 26. The granular material discharges in this inverted position from the collector opening 26 and is diffused over the food product or the like by means of the diffuser 22. The diffuser 22 may include a series of openings 54 to assist in the spread of material.

Figure 6:
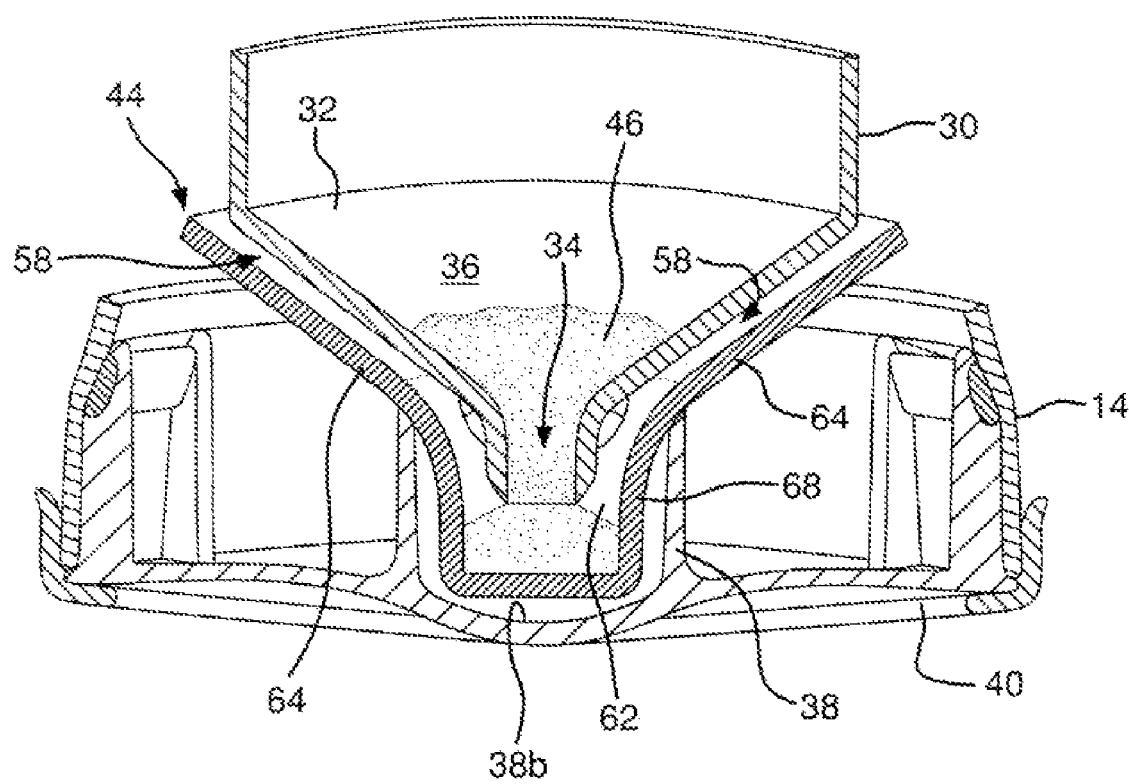
FIG. 6 is a partial cross sectional view of the control plug and metering cup portions of the dispenser of FIGS. 1-5.

The control plug 44 is provided within the metering cup 38 and adjacent the nozzle 34 and reservoir 30. The control plug 44 is defined by an internal cup 62 that projects from a baffle plate 64 into the metering cup 38. As illustrated in FIGS. 3 and 6, the plug cup 62 is spaced from the bottom 38b of the metering cup 38 and has an outer diameter which is less than the inner diameter of the metering cup 38. The nozzle 34 directs the granular material 46 into the cup 62 of the control plug 44. The material fills the plug cup 62 (upon the dispenser being placed in the position shown in FIG. 6). The baffle plate 64 extends radially outwardly from the plug cup 62 and is contacted by the sidewall structure of the metering cup 38, such that (upon inversion) material within the cup 62 is directed along the baffle plate 64 within the open area 58.

Figure 4:
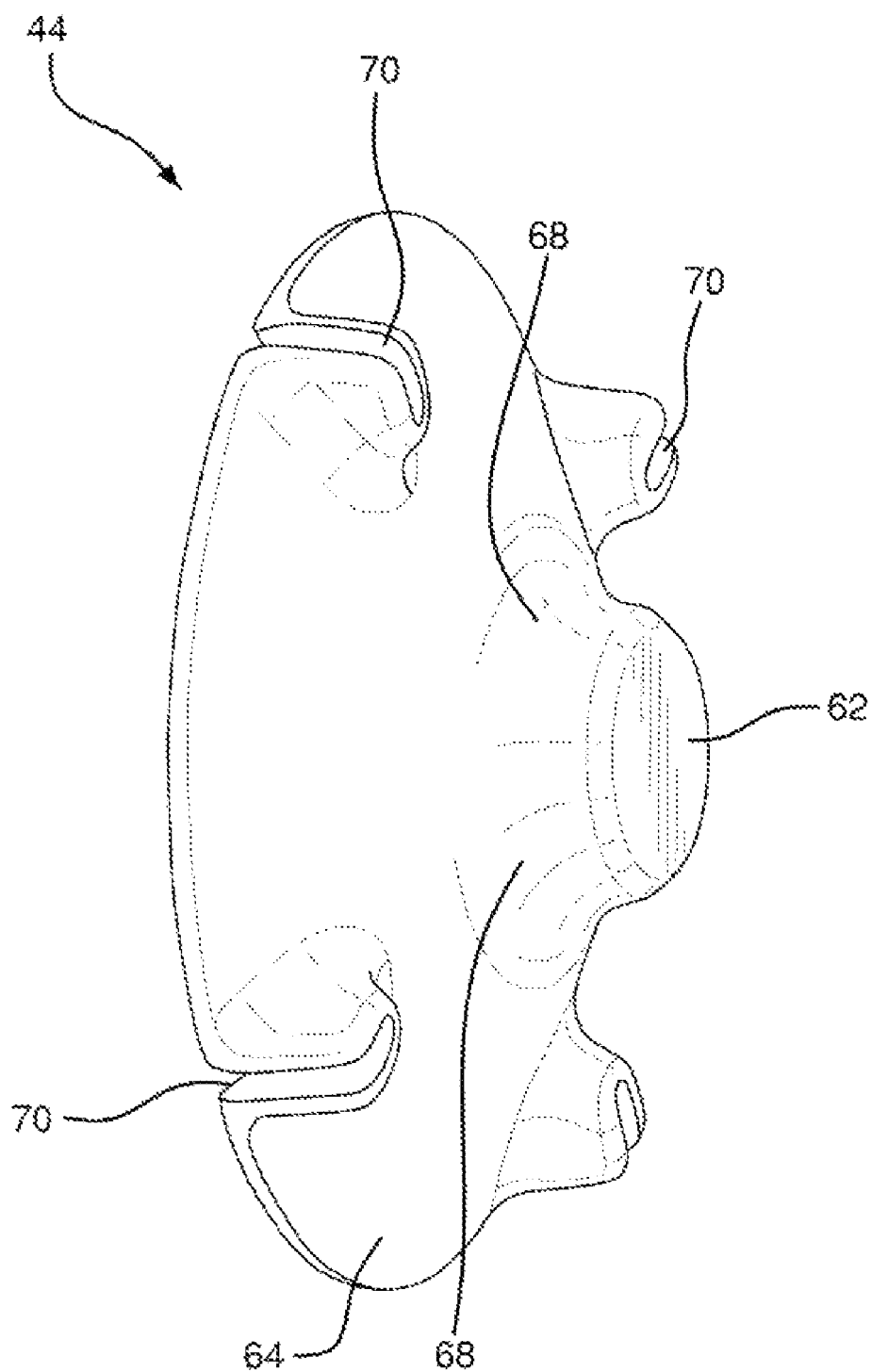
FIG. 4 is a perspective view of a control plug portion of the dispenser of FIGS. 1-3.
Figure 5:
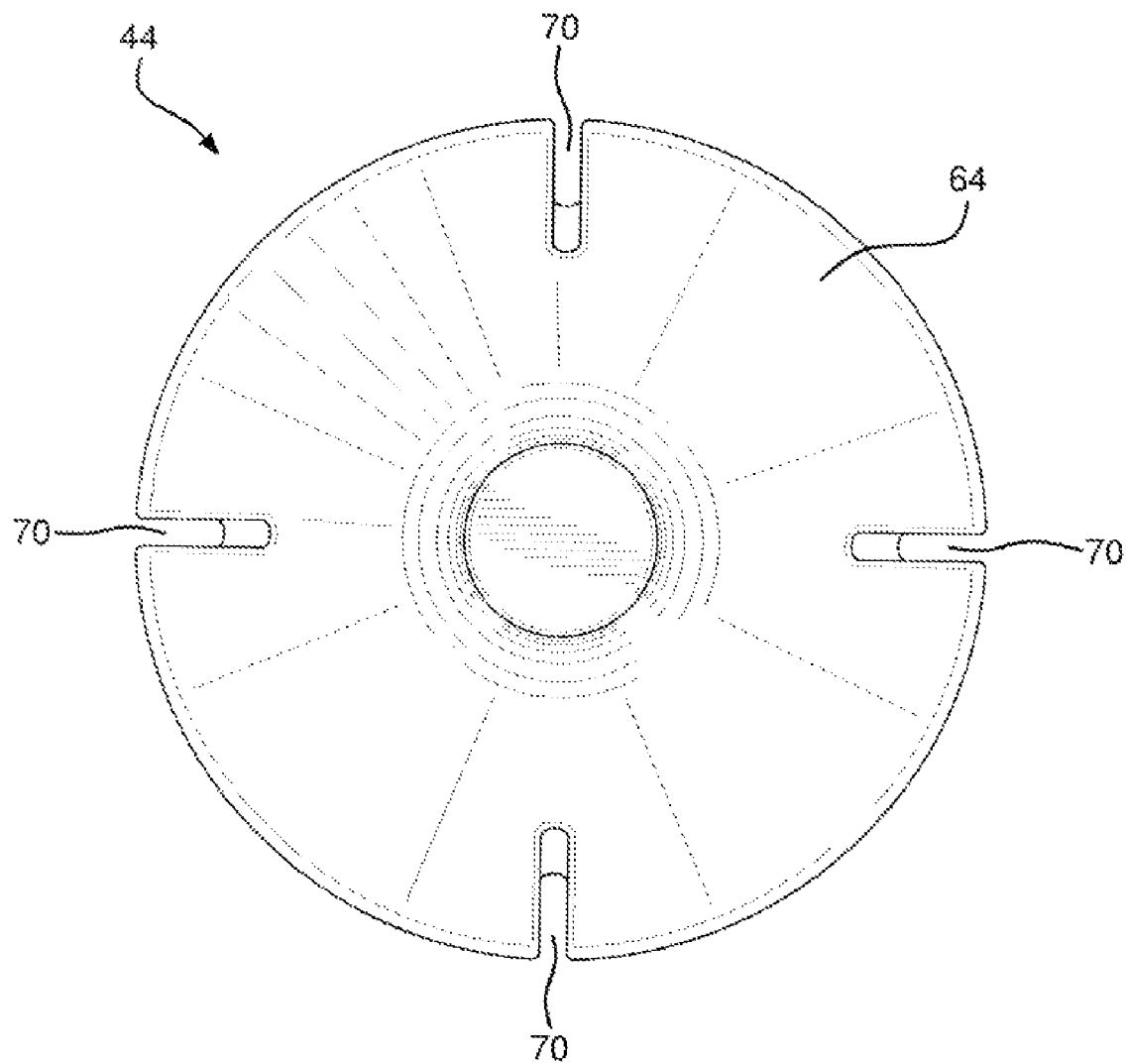
FIG. 5 is a plan view of the control plug shown in FIG. 4.

In FIGS. 4 and 5, the structure of the control plug 44 is illustrated. Preferably, the plug 44 is constructed from a rigid material, such as metal or plastic, but may be flexible. In FIG. 4, the plug 44 is shown in perspective view with the cup portion 62 integrally formed with the baffle plate 64 and a flange 68. A series of slots 70 are formed in the baffle plate 64 for engagement with the reservoir ribs 72 (see FIG. 2). An opening 58 (FIG. 3) is provided for directing of the granular material from the plug cup 62 through the space between the baffle plate 64 and angled surface 36. The material is thus free to flow along the angled surface 36 to the passageway 52 (see FIG. 3). FIG. 5 shows a top plan view of the baffle plate 64 with the plug cup 62 in the center thereof.

In FIG. 6, the dispenser 10 is in its first or loading orientation whereby granular material 46 is fed down the angled surface 36 and through the nozzle 34, filling the plug cup 62. When the dispenser is inverted to the discharge position (shown in FIG. 3), some granular material falls from cup 62 back into reservoir 30 via nozzle 34. The remaining material 46 in cup 62 flows into the open area 58, for passage along the outside surface of cap 32 and into the passageway 52 (and eventually through the collector opening 26 to the diffuser 22).

As shown in FIG. 6, the quantity of material 46 within the internal reservoir 30 rests against the angled surface 36 of the reservoir cap 32. Additional granular material 46 flows through the nozzle 34 and comes to rest within the plug cup 62. The granular material 46 forms an angle of repose within the cup, which fixes the volume of material to be dispensed. As shown, nozzle 34 projects inwardly into the plug cup 62.

Generally, the control plug 44 serves to reduce the volume of material to be discharged. If the plug cup 62 is removed, the material 46 would fill the larger volume of the metering cup 38. Upon inversion of the dispenser to the discharge position, the charge of material will flow out of the plug cup 62, inwardly of the baffle plate 64 and through the open area 58. The open area 58, between the reservoir cap 32 and the baffle plate 64, directs the charge of material into the passageway 52.

The volume of material to be dispensed in this embodiment is dependent upon the relationship between the position of the nozzle 34 and the size of the plug cup 62. Thus, for a larger spacing between the nozzle 34 and the bottom surface of the plug cup 62, a larger charge of material will be provided. In addition, a larger or smaller cup 62 adjusts the charge accordingly.

Figure 7:
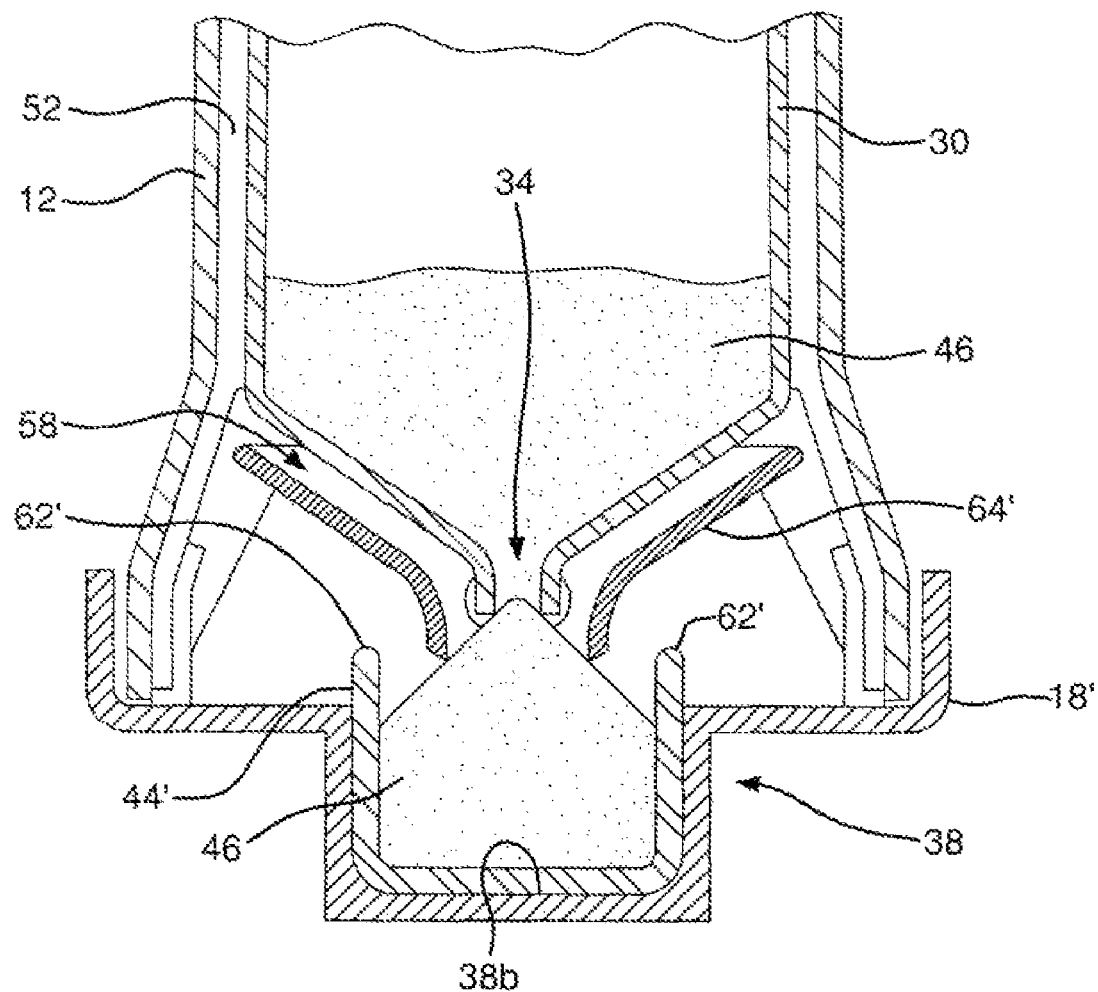
FIG. 7 is a partial cross sectional view of an embodiment of a control plug.

FIG. 7 shows a plug cup 62' for use with a dispenser embodiment, which conforms to the inner surface 38b of the metering cup 38 of cap 18'. In addition, the plug cup 62' of control plug 44' is a separate piece from the baffle plate 64'. Accordingly, the axial spacing from the nozzle 34 to the base 38b of the metering cup 38 is relatively larger and the baffle plate 64' contacts the angle of repose of the material 46 in the plug cup 62'.

Figure 8:
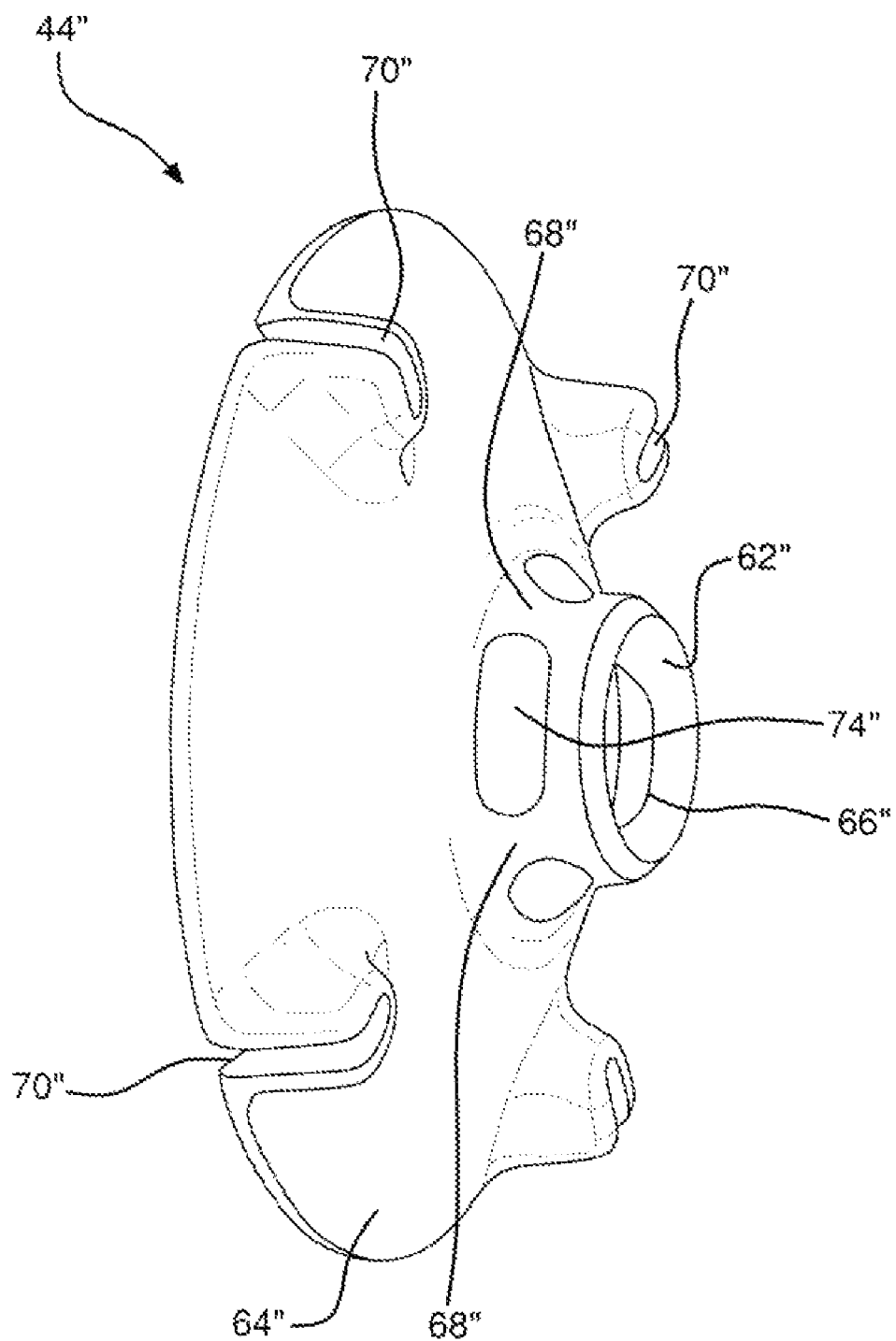
FIG. 8 is a perspective view of a further embodiment of a control plug.
Figure 9:
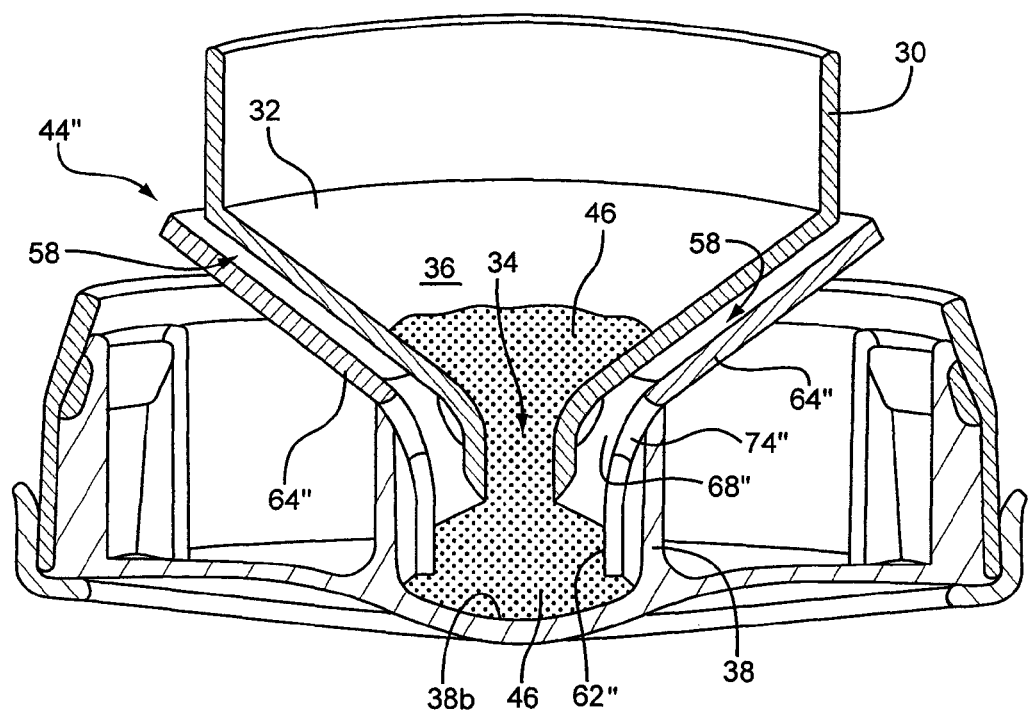
FIG. 9 is a cross sectional view of the control plug of FIG. 8 within a dispenser.

FIGS. 8 and 9 show a further embodiment of the control plug 44". In FIG. 8, which shows a structure similar to that in FIG. 4, the baffle plate 64" supports a plug ring 62" having an opened bottom end 66". The plug ring 62" is supported by a series of flanges 68" at the base of the baffle plate 64". Between the flanges 68" is provided a series of openings 74" that separate the plug ring 62" from the baffle plate 64". A plurality of slots 70" are provided on the periphery of the baffle plate 64" which may engage reservoir ribs 72.

FIG. 9 shows the control plug 44" positioned adjacent the reservoir 30 and having an angled surface 36 provided adjacent the nozzle opening 34. The nozzle 34 directs the granular material 46 toward the metering cup 38. The plug ring 62" is positioned within the metering cup 38 and spaced from the bottom surface 38b of the cup 38. The plug ring 62" is positioned well into the cup 38 and below the nozzle 34. Thus, the plug ring 62" defines an inwardly spaced wall with respect to the walls of the metering cup 38. The plug ring 62" serves to restrict the overall volume of material 46 that is needed to fill the metering cup 38. Some of the material 46 is resting on the bottom surface 38b of the metering cup 38. When the dispenser is inverted for discharge of the metered dose, the material 46 moves through the opening defined by the control plug or outwardly thereof, along the walls of the cup 38 and through the opening 74" (between adjacent flanges 68" in the control plug 44"). The metered dose then moves through the open area 58 defined between the baffle plate 64" and the angled surface 36 of the reservoir.

The plug ring 62" may be of any size desired in order to control the volume of material within the metering cup 38. The depth of the plug ring 62" into the metering cup 38 controls the amount of material in the cup 38. In addition, increasing the thickness of the ring or closing a portion of its bottom surface further reduces the amount of material required to fill the cup 38. It is desirable to have the plug ring 62" or similar structure extend significantly into the cup 38 to occupy a portion of the metering cup 38. In addition, the plug ring 62" permits discharge of the material into the open area 58. In the embodiments in FIGS. 8 and 9, the plug ring is open and the openings 74" permit egress of the material charge out of the cup 38 upon inversion. Closing the bottom of the ring further reduces the overall available volume within the metering cup 38 for receipt of a material charge.

In summary, the dispenser is capable of accurately delivering a controlled volume or quantity of granular material. The dispenser employs a simple, inexpensive mechanism for quickly and accurately changing the measured quantity of granular material to be dispensed. The plug within the metering cup reduces the measured volume of the charge, as compared to the volume of the metering cup. The plug is preferably removable from the metering cup to permit change of the measured quantity of material.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. A dispenser for delivering granular materials comprising:
    a container assembly having an outer enclosure and an inner reservoir for containing a granular material, said enclosure having an opening for the outflow of material, said enclosure and reservoir defining a passageway therebetween;
    said inner reservoir defining a nozzle for the outflow of material;
    a metering cup disposed at one end of the enclosure and having an open end, the open end opposing said nozzle, the metering cup adapted to receive through the open end of the metering cup a controlled quantity of material directed from the reservoir and through the nozzle, when the container assembly is disposed in a first orientation, and for delivering the material to the passageway, when the container is disposed in a second orientation; and
    a control plug positioned within the metering cup for setting the quantity of material directed into the metering cup, wherein the control plug comprises a plug having an opening adjacent the nozzle to receive therethrough material from the nozzle.

2. The dispenser according to claim 1 wherein the control plug comprises a plug cup having a sidewall which is inwardly spaced from the metering cup.

3. The dispenser according to claim 1 wherein the control plug is detachably retained within the container assembly.

4. The dispenser according to claim 1 wherein said control plug defines a ring positioned within the metering cup, and wherein said granular material accumulates within the cup, occupying a portion of the retention volume defined by said cup.

5. The dispenser according to claim 4 further comprising a plurality of flanges supporting the ring within the metering cup and maintaining the axial position of the plug.

6. The dispenser according to claim 1 wherein the relative position of the control plug and the inner reservoir define an open area in communication with the passageway.

7. The dispenser according to claim 1 wherein the control plug is a separate element that removably fits within the metering cup.

8. The dispenser according to claim 1 wherein the control plug defines a baffle plate and a plug cup.

9. A dispenser for delivering granular material comprising:
a container assembly defining an enclosed volume;
a diffuser disposed at one end of the container assembly for spreading granular material dispensed from an opening within the assembly;
an inner reservoir for retaining granular material within the container assembly, the inner reservoir having a nozzle;
a passageway defined within the assembly for directing material to the opening;
a metering cup disposed at one end of the container assembly adjacent the nozzle, the metering cup defining a controlled volume for granular material transferred from the reservoir through the nozzle and, upon inversion of the container assembly, for delivering the controlled volume through the opening to the diffuser;
a baffle plate spaced radially outward of the nozzle and radially inward of the metering cup, the baffle plate positioned to engage a quantity of material within the metering cup; and
a control plug removably positioned within the metering cup for reducing the volume of material retained by the metering cup.

10. The dispenser according to claim 9 wherein the control plug comprises an annular ring, the annular ring positioned below the nozzle within the metering cup and occupying a portion of the material charge volume of the cup.

11. The dispenser according to claim 10 wherein the control plug further comprises at least one opening between the ring and the baffle plate in communication with the passageway.

12. The dispenser according to claim 9 wherein the baffle plate and the control plug are integrally formed.

13. A dispenser for delivering granular material comprising:
a container assembly having a passageway in communication with a dispenser opening for the outflow of granular material;
an inner reservoir for storing granular material, the inner reservoir positioned within the container assembly and having a reservoir opening for the outflow of granular material;
a metering cup coupled to the container assembly and positioned opposite the reservoir opening, the metering cup in communication with the reservoir opening for receiving a measured quantity of material from the reservoir and in communication with the passageway for discharging the measured quantity of material, and
a plug removably positioned within the metering cup, the plug reducing the volume of the metering cup available for the material to be received within the metering cup, wherein material received within the metering cup flows through the plug during the discharge.

14. The dispenser according to claim 13 further comprising a diffuser for spreading granular material dispensed from the dispenser opening.

15. The dispenser according to claim 13 wherein said control plug defines a ring positioned within the metering cup.

16. The dispenser according to claim 15 further comprising a plurality of flanges supporting the ring within the metering cup and maintaining the axial position of the plug.

17. The dispenser according to claim 13 wherein the control plug comprises a plug cup having a sidewall which is inwardly spaced from the metering cup.

18. The dispenser according to claim 17 wherein the control plug further comprises a baffle plate.

19. A dispenser for delivering granular materials comprising:
a container assembly having an outer enclosure and an inner reservoir for containing a granular material, said enclosure having an opening for the outflow of material, said enclosure and reservoir defining a passageway therebetween;
said inner reservoir defining a nozzle for the outflow of material;
a metering cup disposed at one end of the enclosure and having an open end opposing said nozzle, the metering cup adapted to receive a controlled quantity of material directed from the reservoir and through the nozzle, when the container assembly is disposed in a first orientation, and for delivering the material to the passageway, when the container is disposed in a second orientation; and
a control plug positioned within the metering cup for setting the quantity of material directed into the metering cup,
wherein the control plug comprises a plug cup having a sidewall which is inwardly spaced from the metering cup.

20. A dispenser for delivering granular materials comprising:
a container assembly having an outer enclosure and an inner reservoir for containing a granular material, said enclosure having an opening for the outflow of material, said enclosure and reservoir defining a passageway therebetween;
said inner reservoir defining a nozzle for the outflow of material;
a metering cup disposed at one end of the enclosure and having an open end, the metering cup opposing said nozzle, the metering cup adapted to receive a controlled quantity of material directed from the reservoir and through the nozzle, when the container assembly is disposed in a first orientation, and for delivering the material to the passageway, when the container is disposed in a second orientation; and
a control plug positioned within the metering cup for setting the quantity of material directed into the metering cup, wherein said control plug defines a ring positioned within the metering cup, and wherein said granular material accumulates within the cup, occupying a portion of the retention volume defined by said cup.

21. The dispenser according to claim 20 further comprising a plurality of flanges supporting the ring within the metering cup and maintaining the axial position of the plug.

22. A dispenser for delivering granular materials comprising:
a container assembly having an outer enclosure and an inner reservoir for containing a granular material, said enclosure having an opening for the outflow of material, said enclosure and reservoir defining a passageway therebetween;
said inner reservoir defining a nozzle for the outflow of material;
a metering cup disposed at one end of the enclosure and having an open end, the metering cup opposing said nozzle, the metering cup adapted to receive a controlled quantity of material directed from the reservoir and through the nozzle, when the container assembly is disposed in a first orientation, and for delivering the material to the passageway, when the container is disposed in a second orientation; and a control plug positioned within the metering cup for setting the quantity of material directed into the metering cup, wherein the control plug defines a baffle plate and a plug cup.

23. The dispenser according to claim 1 further comprising a diffuser for spreading granular material dispensed from the opening.

* * * * *